United States Patent [19]

Shuman

[11] 3,936,801

[45] Feb. 3, 1976

[54] MULTIFREQUENCY SIGNAL RECEIVER TIMING CIRCUIT

[75] Inventor: Dennis Shuman, Brooklyn, N.Y.

[73] Assignee: Bell Telephone Laboratories, Incorporated, Murray Hill, N.J.

[22] Filed: Sept. 12, 1974

[21] Appl. No.: 505,204

[52] U.S. Cl. ... 340/171 R; 340/168 R; 340/168 CC; 340/171 PF
[51] Int. Cl.² ......................................... H04Q 5/00
[58] Field of Search ..... 340/171 R, 167 A, 168 CC, 340/168 R; 328/112

[56] References Cited
UNITED STATES PATENTS

| | | | |
|---|---|---|---|
| 3,281,790 | 10/1966 | Roscoe | 340/171 R |
| 3,718,918 | 2/1973 | Fothergill | 328/112 X |
| 3,818,358 | 6/1974 | Russel | 328/112 X |

Primary Examiner—Harold I. Pitts
Attorney, Agent, or Firm—John F. Moran

[57] ABSTRACT

A digital timing circuit comprising integrated circuits is presented for multifrequency signal receivers in which a first counter is pulsed by a clock to generate predetermined timing intervals under the control of a second counter. The second counter sequentially recycles the first counter to make multiple use of the stages therein to provide various timing intervals, each associated with a timing function, e.g., initial state and signal persistence timing, fixed duration output pulse, signal check and delayed steering release. Multiple use of the first counter by the second counter provides efficient use of the first counter and reduces size and cost of the circuit.

11 Claims, 4 Drawing Figures

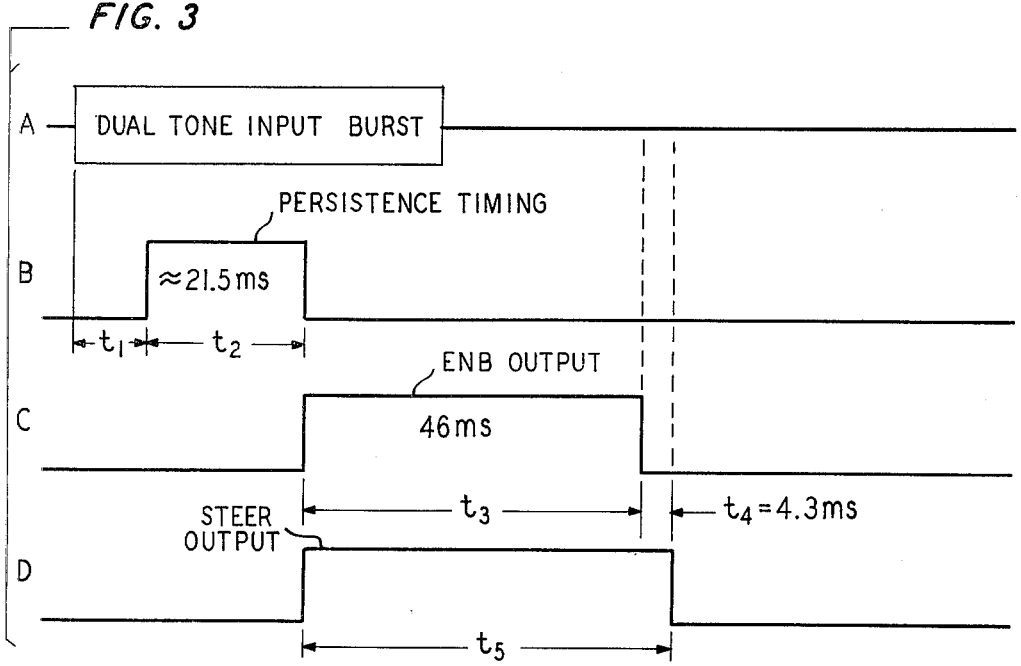
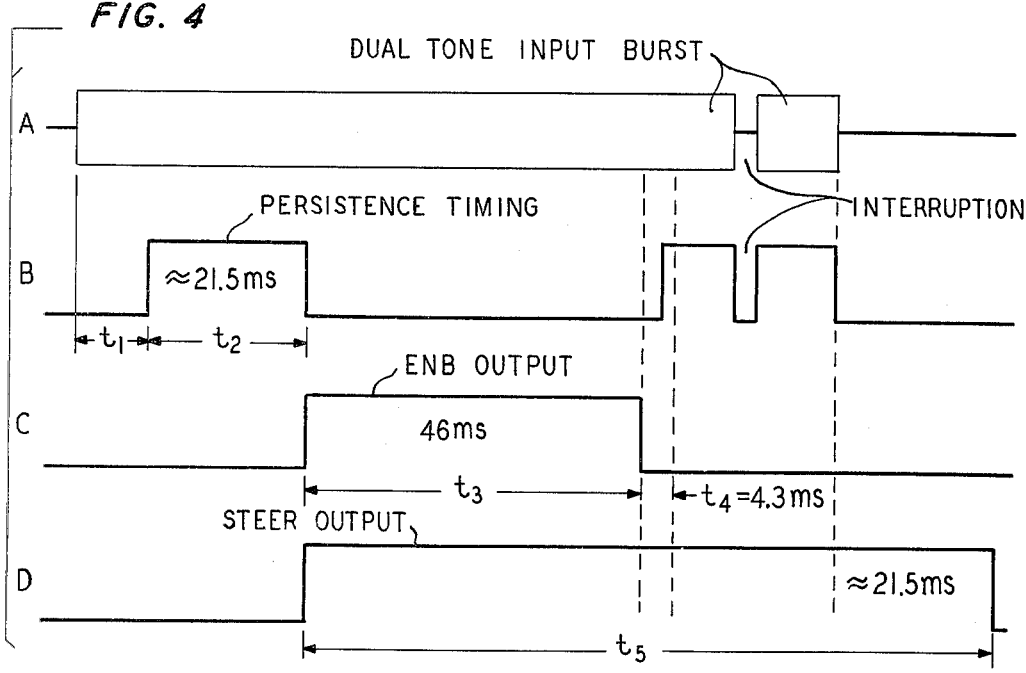

MULTIFREQUENCY SIGNAL RECEIVER TIMING CIRCUIT

BACKGROUND OF THE INVENTION

This invention relates to communication signaling systems and, more particularly, to integrated circuit timing circuits which reduce the size and cost of the commonly employed circuitry for checking signal validity in multifrequency signal receivers.

In the field of telephony, signal receivers employing tone detectors are often of the multifrequency type requiring apparatus capable of responding only to coincidental signaling bursts of certain disparate frequency pairs. U.S. Pat. No. 3,281,790, issued to L. C. J. Roscoe on Oct. 25, 1966, is illustrative of such a receiver. In prior art receivers, such as that disclosed by Roscoe, for example, various circuit combinations are employed to test the validity of incoming combinations of coincident two-tone bursts in order to ensure that the output signals of the receiver are generated only in response to valid input signals. The timing circuitry then delivers two different outputs. One output is of fixed duration, independent of the incoming tone burst duration. The duration of the second output is conditionally extended past the termination of the input signal and is unaffected by interruptions in the input signal which do not exceed a predetermined interval.

With the advent of electronic central office and Private Branch Exchange (PBX) systems employing solid-state and electronic switching devices, the emphasis in the design of multifrequency signal receivers is toward compatible integrated circuits with low voltage and current requirements. Heretofore, the timing circuits used to check the validity of incoming signals and to generate responsive outputs have utilized a combination of analog circuitry comprising discrete active devices and passive components. Such discrete timing circuits tend to be bulky, costly and require rather large powering potentials.

It is, accordingly, a primary object of the present invention to provide digital integrated circuitry for performing the various timing functions in multifrequency receivers.

It is a related object of the invention to provide a digital timing circuit which utilizes standard integrated circuit components that operate reliably on low-powering potentials.

A further object of the invention is to reduce the size and cost of timing circuits employed in multifrequency receivers by efficient use of integrated circuit technology.

SUMMARY OF THE INVENTION

These and other objects of the invention are achieved in accordance with the principles of the invention by a combination of two digital counting circuits. The first of the two counting circuits is clocked to provide a preselected timing interval determined by the clocking rate and the number of clock pulses counted. The first counting circuit is controlled by the second counting circuit. As the first counter arrives at a preselected position in its counting sequence, the second counter ascertains this position in the count and sequentially recycles the first counter so that the two circuits follow a timing sequence by making multiple use of the stages in the first counter. Utilization of this principle provides a flexible and efficient approach for providing any desired timing sequence or procedure.

In an illustrative embodiment of the present invention, a gating arrangement detects the presence of a conditionally valid two-tone burst and signals the first counter. The first counter initially responds by starting the counting sequence which is maintained to the end of the count, provided the gating signal is continually present. When the first counter reaches the end of the count the second counter changes state and produces an output signal. At this point, the two-tone burst that prompted the gating signal to start the first counter has met the signal persistence test and is therefore valid. The first counter is then recycled through a second count independent of the gating signal. At the end of the second count, the first counter is again recycled by the second counter. When the first counter reaches the end of the new count, the second counter terminates its output signal. The momentary presence of the gating signal is then checked within a predetermined interval. The two counting circuits respond to the absence of the gating signal for the duration of this interval by returning to the initial state they were in before the first occurrence of the gating signal. If, however, the gating signal appears during this interval, the first counter is recycled and locked up until the termination of this signal. Upon the termination of the gating signal, the first counter is then freed and counts to the end of its sequence provided that the gating signal does not reappear at any time during the sequence. The second counter responds to the end of this sequence by assuming an initial state which, in turn, causes the first counter to also assume its initial state. If the gating signal reappears before the end of this counting sequence, the circuitry recycles the first counter and holds it locked up until the end of the gating signal whereupon the final counting sequence begins again.

In accordance with a feature of the invention, the second counter provides recycling sequence control of the first counter thereby making multiple use of the stages in the first counter.

BRIEF DESCRIPTION OF THE DRAWING

These and other objects and features of the invention will be more readily appreciated and better understood by reference to the following detailed description which should be considered in conjunction with the accompanying drawing in which:

FIG. 3 is a set of waveforms depicting the response of the timing circuit of FIG. 2 to short signal operation; and FIG. 4 is a set of waveforms generated by the timing circuit of FIG. 2 during long signal operation.

DETAILED DESCRIPTION

Figure 1:
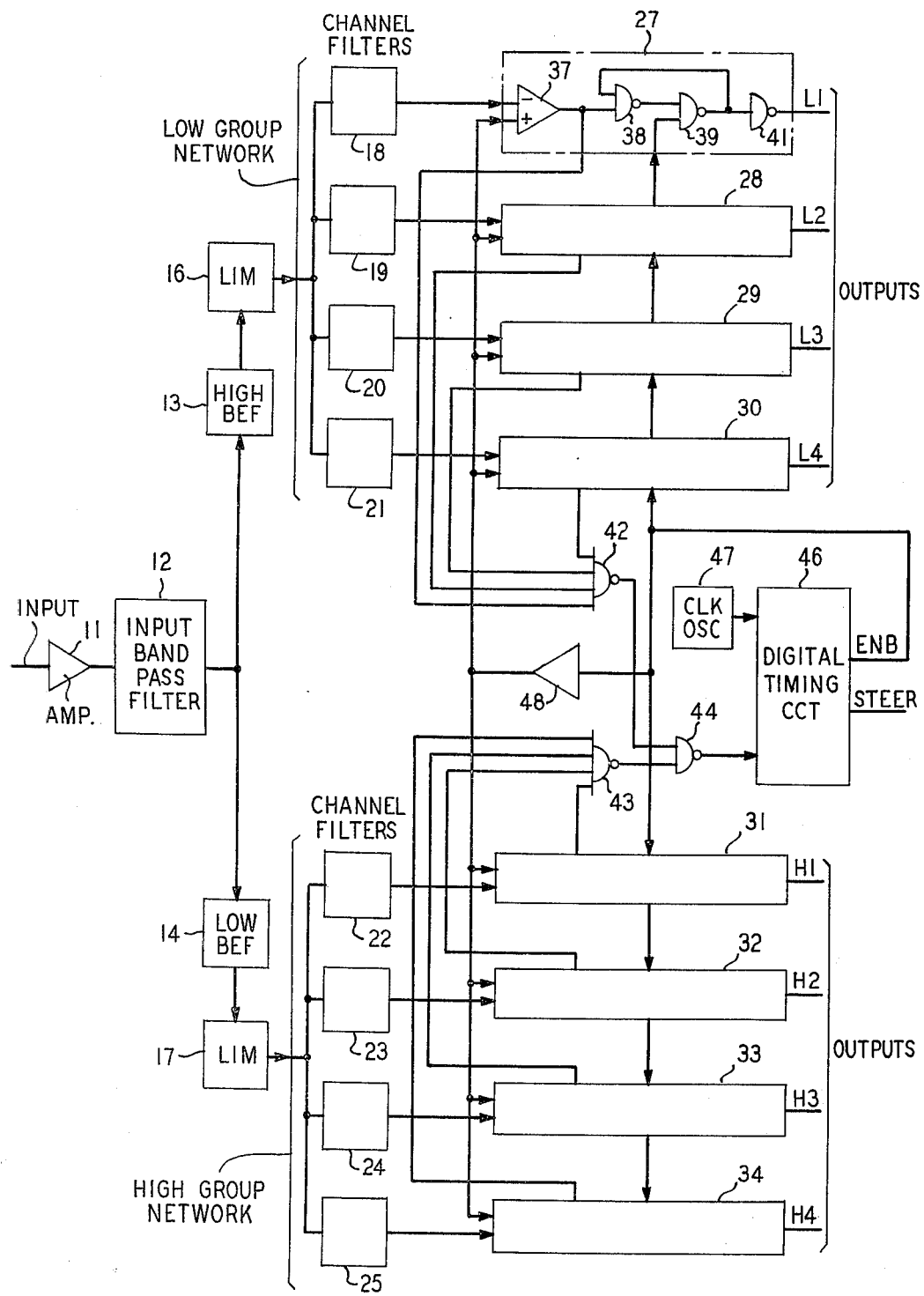
FIG. 1 is a block diagram of an illustrative multifrequency signal receiver serving to demonstrate an application of the inventive timing circuit.

In FIG. 1, the incoming signal is applied to an input or buffer amplifier 11 whose output is applied to filter 12. Filter 12 eliminates dial tone from the input signal and also signaling frequencies above 3000 Hz which are commonly used for testing purposes. The output of filter 12 is applied to each of two band elimination filters 13 and 14. Filter 13 eliminates the relatively high group frequency band while filter 14 eliminates the relatively low group frequency band. Outputs from filters 13 and 14 are furnished respectively to limiters 16 and 17. The function of limiters 16 and 17 is to convert the tone burst input signals which occur at any one channel signaling frequency in each of the group frequency bands into two symmetrical square wave outputs whose fundamental frequencies correspond to a channel frequency in the respective frequency band. Filters 18 through 21 in the low group band and filters 22 through 25 in the high group band are each designed to pass only one channel frequency within each frequency band.

In the low group network, each of filters 18 through 21 is connected to a respective one of comparators 27 through 30. Corresponding units in the high group band network are comparators 31 through 34. Each of the comparators 27 through 34 may produce an output signal from its corresponding filter which starts digital timing circuit 46 to perform a signal validity check.

For the sake of simplicity only comparator 27 is shown in detail since all the comparators are essentially identical in structure and function. Comparator 27 comprises an operational amplifier 37 whose output signal passes along the signal path of serially connected gates 38, 39 and 41. All of the operational amplifiers in comparators 27 through 34 each compare the output of their respective filter to a threshold or level generated by threshold generator 48. Gate 41 produces the appropriate output signal only after gate 39 is enabled by digital timer 46. The output of operational amplifier 37 is also applied to gate 42 which has three other inputs that are each respectively connected to one of the comparators 28 through 30. Gate 43 performs a corresponding function for the high group network comprising comparators 31 through 34.

As gates 42 and 43 produce coincidental output signals, the output of gate 44 changes level and a signal validity check is performed within digital timing circuit 46 during the level change. Upon satisfaction of the signal validity test which may, for example, measure the coincidental persistence of two signaling tones, one from each of the two frequency bands for a predetermined interval, such as 22 milliseconds, digital timing circuit 46 produces an output which is applied to each of comparators 27 through 34. This enabling signal has the effect of only allowing the respective comparators in each frequency band network which were initially operated by their respective filters to deliver an output. Correspondingly, this same signal is also applied to threshold generator 48 which increases the level of its output signal applied to comparators 27 through 34. The change in signal output of threshold generator 48 raises the threshold level within each of the comparators such that only the comparator which was originally enabled in each of the two networks is capable of remaining in that state while all the other comparators are effectively inhibited from being enabled. The feeding back of an output of the timing circuit 46 only allows the respective comparators that were originally activated to produce an output signal. In normal receiver operation one comparator will produce an output in the low group network and only one comparator in the high group network will produce an output. Each combination of dual outputs from the receiver of FIG. 1 is determined by the frequency combination present in the tone burst and is indicative of a different intelligence character or digit being signaled by the telephone caller.

In operation, an input burst comprising two tones, one in the low group band and one in the high group band, is applied to common amplifier 11. The amplified output of amplifier 11 is applied via filter 12 to filters 13 and 14. The tone in the high frequency group is blocked by band elimination filter 13 and the tone in the low group band is blocked by filter 14. Limiter 16 converts the low frequency tone into a square wave of like frequency and a similar function is performed by limiter 17 on the tone in the high group band. The outputs from the limiters each result in an output from a respective pair of channel filters 18 through 25. For example, filters 18 and 22 each may produce an output which are each respectively applied to comparators 27 and 31.

All the comparators in the receiver of FIG. 1 are initially biased by threshold generator 48 to create a threshold or level which must be overcome before a signal from their respective filters can be conditionally considered as valid. In this case, the differential amplifier 37 of comparator 27 will not produce an output that is capable of enabling gates 38 and 42 unless the threshold is exceeded. Once the threshold test of comparators 27 and 31 are met, the two comparators are partially enabled by the output of each differential amplifier therein. These outputs of comparators 27 and 31 are individually applied to NAND gates 42 and 43. The coincidence of the signals at NAND gates 42 and 43 is signaled by a change in level of the output of NAND gate 44 to digital timing circuit 46. Timing circuit 46 initially performs a validity check of the persistence of the input tone bursts and then may proceed through a signal dependent timing sequence. The output of clock oscillator 47 is used in the operation of timing circuit 46. The foregoing procedure and the operation of timing circuit 46 will be discussed more fully hereinafter in connection with FIG. 2.

If the coincidence duration test imposed by digital timing circuit 46 is satisfied, all required tests have been passed, the input signals are accepted as valid, and the output phase of the receiver operation is initiated.

In response to an output from digital timing circuit 46, comparators 27 and 31 produce an output pulse of fixed duration. At the same time, the output of digital timing circuit 46 is applied to threshold generator 48 which raises the threshold level in all comparators 27 through 34. In comparator 27 the output of NAND gate 39 is fed back to an input of NAND gate 38. Comparators 27 and 31, like all other comparators when partially enabled, are designed to produce a final output only in response to an input signal from digital timing circuit 46. The final output signal is maintained even though the threshold level applied by threshold generator 48 to amplifier 37 is high enough to cause a level shift in the output of amplifier 37. At this time the feedback path from NAND gate 39 to NAND gate 38 retains control of comparator 27 so that NAND gate 41 produces an output. The same operation occurs internally in comparator 31. Thus, two outputs are produced indicative of an intelligence character or digit being signaled by the telephone caller.

Figure 2:
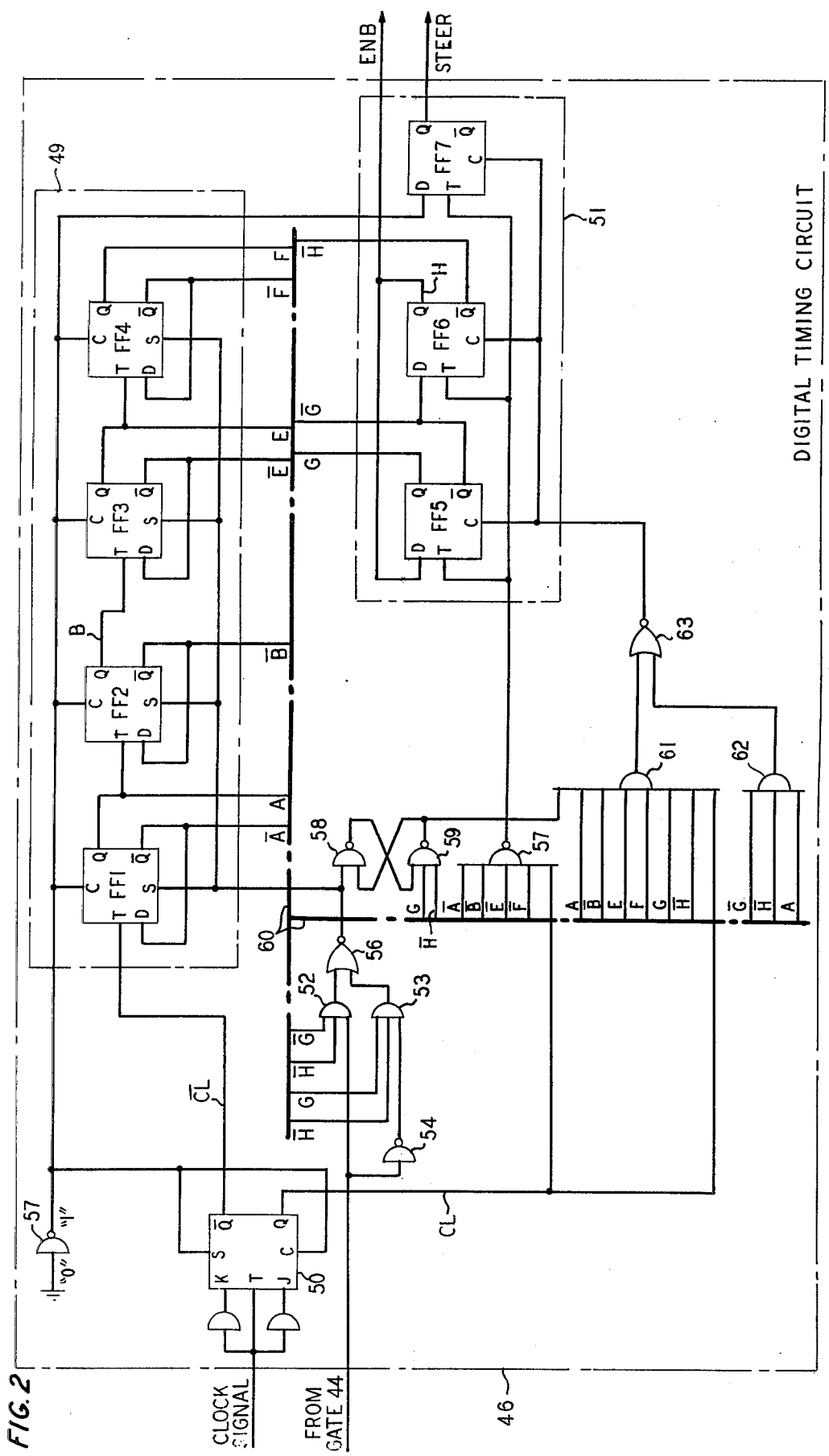
FIG. 2 is a detailed block diagram of a signal timing circuit in accordance with the invention which may be employed in the receiver of FIG. 1.

FIG. 2 is an illustrative embodiment of the invention depicted as a detailed block diagram of the timing circuit utilized in FIG. 1. Basically, the timing circuit comprises a first counter 49 and a second counter 51 which are interconnected by a gating arrangement. A multiple conductor connection between the outputs of counters 49 and 51 to the gating arrangement is simply illustrated by dashed line 60. Single conductors terminating at line 60 with the same letter designations are electrically connected together.

Counter 49 comprises flip-flops 1 through 4 which are connected as a 16-state ripple counter. Counter 49 is initially set in the all 1's state and is sequentially counted down by clock pulses to provide interval timing. The outputs of flip-flop 4 produce the most significant digits, while the outputs of flip-flop 1 produce the least significant digits in the counting sequence of counter 49. The clock pulses are applied to counter 49 by flip-flop 50, which divides the frequency of the clock signal input by two.

Counter 51 comprises flip-flops 5 and 6 and an output flip-flop 7. Counter 51 is a four-count synchronous Gray code counter which is used for sequence control of counter 49. In the Gray code of counter 51, only one of the two digits change between counts to prevent momentary false states. The circuitry of FIG. 2 is also designed to prevent race or hazard conditions and can be operated when power is first turned on without exhibiting false outputs. The state sequence of counter 51 is "00", "01", "11" and "10".

Counter 49 triggers on positive input transitions while counter 51 triggers on negative input transistions at the T or toggle inputs thereof. The bistable stages of both counters can comprise D-type flip-flops. The application of a clock pulse to the T input of a D-type flip-flop serves to transfer the data at the D input to the Q output. During appropriate input conditions, which will become apparent hereinafter, the set (S) and clear (C) inputs to these flip-flops are able to "override" the T and D inputs to control their state. The flip-flops and gates illustrated by FIG. 2 can be readily implemented by those working in the art through standard integrated circuit components of the Transistor-Transistor Logic (TTL) variety. The digital timing circuit of FIG. 2 is in no way restricted to the foregoing designated type flip-flop and other and different known bistable configurations can be used to advantage in the implementation of this inventive circuit.

As an introduction to the operation of the circuitry of FIG. 2, the basic requirements and functions of the timing circuit will be described. This description will provide an overall view of the timing circuit operation relying only upon the essential components responsible for the various functions. The two counters of FIG. 2 assume initial states. Counter 49 is set to the all "1's" state or 15th state and counter 51 is cleared to the all "0's" state. When a dual tone burst is received and divided into two separate tones, each of which appears in one of the two frequency bands, the output level of NOR gate 56 changes from a "0" to a "1". This change in level begins the signal timing interval for checking the signal persistence which must be continuously maintained while counter 49 is clocked from the initial state of "1111" down to the "0000" state. The clocking of counter 49 is only allowed when a "1" output of gate 56 is present at the set inputs of flip-flops 1 through 4.

Upon satisfaction of the signal persistence test, flip-flop 49 reaches the "0000" state which produces all 1's for all but one of the five inputs of NAND gate 57. The next clock pulse from flip-flop 50, which is applied to the remaining input of gate 57, changes the output of that gate from "1" to "0" and switches counter 51 to the "01" state. Accordingly, the enable (ENB) and STEER outputs of FIG. 2 from flip-flops 6 and 7 both produce a "1" output. Counter 51 stays in the "01" state as counter 49 is recycled and downcounted from the 15th to the "0" state. The "11" state is then assumed by counter 51 while counter 49 is again recycled and downcounted from all 1's to all 0's. This switches counter 51 to the "10" state and ends the logical "1" on the ENB output of FIG. 2. At the end of the output pulse on the ENB output of FIG. 2, a check is made to determine if the incoming signal is still present.

In the absence of a dual tone burst and the presence of the other inputs from counter 51 to AND gates 52 and 53, NOR gate 56 remains at a "1" output and allows counter 49 to be reset to 15. At this point, clock 47 downcounts counter 49 and the 13th state is then detected by AND gate 61. It should be noted that while counter 51 is in the "10" state NAND gates 58 and 59, which are connected as an RS flip-flop, provide a "1" output to AND gate 61 in the absence of a dual tone burst as indicated by NOR gate 56. This "1" output to gate 61 allows it to detect the 13th state of counter 49. Gate 61 responds by changing its output level from "0" to "1" and the inputs to AND gate 62 are such that it produces a "0" output. Accordingly, the output of NOR gate 63 changes from "1" to "0". This ends the STEER output of flip-flop 7, places the two other flip-flops of counter 51 in the "00" state, and resets counter 49 back to the initial state of "1111". Both counters of FIG. 2 are now in the initial state and ready to evaluate a new dual tone burst.

The foregoing operation occurs in response to a short dual tone burst. If a long dual tone burst is received, the timing circuit of FIG. 2 responds differently, which will be described. Any momentary occurrence of a dual tone burst within the interval that counter 49 is counted from 15 down to 13, which is sure to happen for a protracted tone burst, will switch the output of gate 56 from a "1" to a "0". This sets counter 49 into the 15th state and sets the RS flip-flop comprising gates 58 and 59 so that the output of the latter gate switches to a "0" level. At this time counter 51 is still in the "10" state and all the circuitry of FIG. 2 will maintain its respective states for the duration of the protracted tone burst. When the burst terminates, gate 56 allows clock pulses to count down counter 49. This time, however, gate 59 of the RS flip-flop prevents gate 61 from detecting the 13th state of counter 49 and it proceeds to be counted down to the "0000" state. In the event that the tone burst momentarily appears during the downcount of counter 49, it is reset back to the 15th state for each appearance and then is counted to the "0000" state. Gate 57, upon the occurrence of the next positive transition of the clock output of flip-flop 50, produces a "0" output which places counter 51 in the "00" state. Gate 62 forces a "0" output from NOR gate 63. In response to the "0" output, flip-flop 7 terminates the STEER output pulse. The circuitry of FIG. 2 is now back in the initial state and ready to receive the next dual tone burst.

In summary, the operation of the circuitry of FIG. 2 is controlled in accordance with the state sequence of counter 51. The initial state and signal persistence timing function are performed while counter 51 is in the "00" state and counter 49 is downcounted to "0000". Then counter 51 switches to the "01" state and initiates a common output pulse of fixed duration at the ENB output and a STEER pulse. The duration of the STEER pulse is variable and is dependent upon the persistence of the dual tone burst after the signal persistence is timed to check validity. The duration of the output pulse is determined by downcounting recycled counter 49 to "0000", changing counter 51 to the "11" state, and again counting down recycled counter 49 to the "0000". This ends the common output pulse. Next, counter 51 is switched to the "10" state and the presence of a dual tone burst is checked between the interval that counter 49 is clocked from the 15th state to the 13th state. In the absence of a tone burst, counter 51 switches to the "00" state, terminates the STEER pulse, and recycles counter 49 back to the 15th state. If, on the other hand, a tone burst is present, counter 51 stays in the "10" state and begins a steering delay release function. Initially, counter 49 is locked up in the 15th state and counter 51 maintains the "10" state until the termination of the tone burst. This allows counter 49 to be clocked down to "0000" state in the absence of the tone burst. When counter 49 reaches "the '0000' state" counter 51 assumes the "00" state, terminates the STEER pulse, and the circuitry of FIG. 2 is back in the initial state. If, on the other hand, a tone burst appears while counter 49 is being clocked down to the "0000" state, counter 49 is recycled back to the 15th state and is locked up there until the tone burst terminates. At this time, counter 49 proceeds to the "0000" state which will switch counter 51 into the "00" state so that the circuitry of FIG. 2 assumes a delayed initial state an interval after the termination of a protracted tone burst.

Further consideration of the operation of the circuitry of FIG. 2 brings to light that the output of NOR gate 56 is controlled by the state sequence of counter 51. More specifically, the other inputs to AND gates 52 and 53 are from the outputs of flip-flops 5 and 6 of counter 51. An analysis of combinational logic indicates that the clocking of counter 49 is controlled by the output of gate 44 only when counter 51 is in "00" and "10" states. In the "00" state, the presence of the signal level from gate 44 which is indicative of a dual tone burst is timed to satisfy the signal persistence test. While counter 51 is in the "01" state, the presence of the other signal level from gate 44 indicative of an interruption of a dual tone burst is timed to provide protection against momentary interruptions that may cause false circuit operation. If counter 51 is in the "01" and "11" states, the output of gate 56 allows counter 49 to be clocked regardless of the output of gate 44. It should be noted that the RS flip-flop comprising NAND gates 58 and 59 can only be switched to the state in which gate 59 produces a "0" when counter 51 is in the "10" state. Likewise, gates 61 and 62 are also connected to the outputs of counter 51 and are accordingly controlled by the state sequence of the latter.

FIGS. 3 and 4 depict illustrative waveforms which serve to demonstrate the response of the circuitry of FIG. 2 to input signals respectively of a normal dual tone burst and a protracted dual tone burst. The timing intervals in FIGS. 3 and 4 are designated in milliseconds. The 21.5 millisecond intervals may vary a small amount (e.g., 1 millisecond) since they are determined by a clock signal that is not synchronous with the occurrence of the dual tone burst inputs. In FIG. 3, waveform A represents a valid tone burst of normal duration. In waveform B a pulse of duration $t_2$ is delayed by an interval of $t_1$. Interval $t_1$ represents the channel circuit operate time which elapses between the start of a dual tone burst and the change in level experienced at the output of gate 44. The persistence of the dual tone burst must be maintained for the duration of interval $t_2$ to be considered valid. Waveform C shows the ENB output pulse with a fixed duration which is produced after the persistence timing test is satisfied. Coincident with the start of the ENB pulse is the STEER pulse. When the ENB pulse terminates, the presence of a dual tone burst is checked during interval $t_4$. In the absence of a tone burst, $t_4$ is the interval that elapses as counter 49 is downcounted from the 15th to the 13th state. The duration of the STEER pulse under these circumstances is $t_5$, or simply the sum of $t_3$ and $t_4$. The two counters of FIG. 2 return to their initial states as the STEER pulse is terminated.

In FIG. 4 the occurrence of a protracted dual tone burst is illustrated by waveform A. Here waveform B also depicts the delayed channel response $t_1$ and the signal persistence timing check during interval $t_2$. The ENB pulse is then produced with a fixed duration. This time, however, the presence of a dual tone burst is ascertained during the $t_4$ interval. Counter 49 is then locked up until the tone burst terminates. This operation starts the slow release mode which includes protection against momentary interruptions in the tone burst. If none of the interruptions exceed the interval that elapses as counter 49 is counted from the 15th state to the "0000" state, the STEER pulse is unaffected. Also, the duration of the STEER pulse is extended past the termination of the dual tone burst. The duration of the extended portion of the STEER pulse is determined by the time elapsed as counter 49 is downcounted to "0000". As the STEER pulse terminates both counters of FIG. 2 return to their initial states.

Although the timing circuit has been disclosed in the context of the illustrative multifrequency receiver of FIG. 1, it should be stressed that the inventive timing circuit is not limited to this application. Accordingly, the timing circuit may be readily utilized in other types of receivers, whether single frequency or of the multifrequency type. Furthermore, the inventive circuit may be used in other types of apparatus in which a timing operation is employed.

What is claimed is:

1. Signal translating means for generating a first output signal of a first preselected duration in response to an input signal of a second preselected duration comprising, in combination, clocking means for generating a periodic signal at a predetermined repetition rate, counting means responsive to the presence of said input signal for beginning and maintaining a count of said periodic signal, and controlling means for ascertaining when said counting means arrives at a preselected point in the count serving to verify the persistence of said input signal for the second preselected duration, said controlling means in response to the arrival at said preselected point producing said first output signal and recycling said counting means for conducting at least one other count of said periodic signal independent of the presence of said input signal thereby establishing the first preselected duration of said first output signal.

2. Apparatus in accordance with claim 1 including checking means for determining the presence of said input signal within a preselected interval after the termination of said first output signal, said checking means stopping the operation of said counting means and said controlling means when said input signal momentarily occurs during the preselected interval, said checking means releasing said controlling means and said counting means in response to the termination of said input signal so that said counting means begins a count of said periodic signal to be maintained while said input signal is absent and terminated upon the presence of said input signal thereby providing protection against a false output caused by momentary interruptions of said input signal, and said checking means allowing said controlling means to be cleared and said counting means to be recycled to the beginning of its counting sequence when said input signal fails to occur during the preselected interval.

3. Apparatus in accordance with claim 2 wherein said controlling means further comprises bistable means for producing a second output signal, said bistable means starting the second output signal coincident with said first output signal and extending past the termination of said first output signal, said bistable means terminating the second output signal at the end of the preselected interval when said input signal fails to occur therein, and said bistable means terminating the second output signal at the end of said count of said periodic signal to be maintained while said input signal is absent when said input signal momentarily occurs during the preselected interval.

4. Apparatus in accordance with claim 3 wherein said counting means comprises four bistable stages connected to switch as a ripple counter through successive binary states and said controlling means comprises two bistable stages connected to switch through four binary states according to a Gray code sequence.

5. A multifrequency signal receiver for converting multifrequency tones into control signals including detecting means for providing a signal as two concurring tones of different frequencies exceed a predetermined amplitude threshold, timing means for providing an output signal when said signal persists for a prescribed interval, said detecting means responding to said output signal by providing control signals corresponding to the frequency combination of said two tones, characterized by said timing means comprising clocking means for generating a periodic signal at a predetermined repetition rate, counting means responsive to the presence of said signal for beginning and maintaining a count of the periodic signal, controlling means for detecting the obtainment of a preselected state by said counting means to test the persistence of said two tones for said prescribed interval, said controlling means in response to the occurrence of said preselected state producing said output signal and recycling the counting means for conducting at least one other count of the periodic signal independent of the presence of said input signal thereby establishing a prescribed duration for said output signal.

6. In a multifrequency signal receiver having an input and a plurality of outputs, in combination, means responsive to the reception of a pair of coincident oscillatory input signals at said input for generating a first signal, the frequency combination of said input signals being indicative of a corresponding intelligence character, clocking means for generating a periodic signal at a predetermined repetition rate, counting means responsive to the presence of said first signal for beginning and maintaining a count of said periodic signal, controlling means for ascertaining when said counting means arrives at a preselected point in the count serving to verify the persistence of said input signals for a predetermined interval, said controlling means in response to the arrival of said preselected point producing an output signal and recycling said counting means for conducting at least one other count of said periodic signal independent of the presence of said input signal thereby establishing a second predetermined interval for said output signal, and means responsive to the output signal of said controlling means for generating a final pair of output signals each applied to a respective one of said outputs, the combination of said last mentioned outputs being indicative of said intelligence character.

7. A multifrequency signal receiver in accordance with claim 6 wherein said counting means comprises four bistable stages connected to switch as a ripple counter through successive binary states and said controlling means comprises two bistable stages connected to switch through four binary states according to a Gray code sequence.

8. A multifrequency signal receiver in accordance with claim 7 wherein said controlling means recycles said counting means to a state comprising all binary 1's such that said clocking means counts down said counting means through a sequence of successively decreasing binary states toward a state comprising all binary 0's.

9. A multifrequency signal receiver in accordance with claim 8 further comprising gating means responsive to said first signal and the binary state of said controlling means for providing first and second outputs for said counting means, said gating means providing the first output to allow said counting means to change state in response to said periodic signal during the presence of a pair of coincident input signals while said controlling means is in the first of said binary states, said gating means providing the first output signal to allow said counting means to change state in response to said periodic signal independent of said input signals while said controlling means is in the second and third of said binary states, said gating means providing the first output to allow said counting means to change state in response to said periodic signal during the absence of a pair of coincident input signals, and said gating means providing the second output to set said counting means into a binary state comprising all 1's during the absence of a pair of coincident input signals while said controlling means is in the first binary state and during the presence of a pair of coincident input signals when said controlling means is in the fourth binary state.

10. A multifrequency signal receiver in accordance with claim 6 further comprising means for detecting the state of said counting means comprising all binary 0's to alter the state sequence of said controlling means one increment each time said counting means is in the state comprising all binary 0's.

11. A multifrequency signal received in accordance with claim 6 further comprising checking means for determining the presence of a pair of coincident input signals after said counting means is counted down to the state comprising all binary 0's and said controlling means is in the third binary state, said checking means determining the presence of a pair of coincident input signals between the interval when said counting means is recycled to the state comprising all binary 1's and is counted down to a predetermined point in its counting sequence.

* * * * *